United States Patent

[11] 3,586,412

[72] Inventor Emmett N. Leith
       Plymouth, Mich.
[21] Appl. No. 730,447
[22] Filed May 20, 1968
[45] Patented June 22, 1971
[73] Assignee The Battelle Development Corporation
       Columbus, Ohio

[54] HOLOGRAPHIC LENS WITH ABERRATION CORRECTION
8 Claims, 10 Drawing Figs.

[52] U.S. Cl. .................................... 350/3.5, 350/162
[51] Int. Cl. .................................... G02b 27/22
[50] Field of Search .......................... 350/3.5, 162

[56] References Cited
OTHER REFERENCES

Horman et al., APPLIED OPTICS. Vol. 6 No. 2, pp. 317—322 (2/1967)

Leith et al., J. OPT. SOC. AM., Vol. 57 No. 5, p. 699 (5/1967)

Rosen. PROCEEDINGS OF THE IEEE, pp 1736—1737 (10/1967)

Kock, PROCEEDINGS OF THE IEEE, pp. 1610—1612 (11/1967)

Kock et al., PROCEEDINGS OF THE IEEE, pp. 1599—1601 (11/1967)

Erdos, IBM TECH. DISC BULLETIN, Vol. 9, p. 291 (8/1966)

Conger et al., 7 APPLIED OPTICS 623—24, (4/1968)

Primary Examiner—David Schonberg
Assistant Examiner—Robert L. Sherman
Attorney—Woodcock, Kurtz & Machiewicz ABSTRACT: A technique for holographically constructing a lens made of stacked Fresnel zone plates on a thick emulsion photographic film which is capable of imaging a wide object field by joining the individual fields of each superimposed Fresnel zone plate to form an unaberrated composite image. The extent of the individual zone plate field is determined by the emulsion thickness and optical construction geometry and thereby allows restriction of this field to a size capable of unaberrated imaging.

PATENTED JUN 22 1971

HOLOGRAPHIC LENS WITH ABERRATION CORRECTION

BACKGROUND OF THE INVENTION

This invention is related generally to optical imaging and more specifically to imaging by a holographically constructed Fresnel zone plate.

Traditional optical imaging by lenses involves bending light rays from an object by a refraction phenomenon into a focused image of the object. It has long been recognized that the wavefront image is not of good fidelity because of lens aberrations which are generally classified into five groups: coma, distortion, astigmatism, curvature of field, and spherical aberration. Such lens imperfections have been solved by specially shaping lenses or by placing multiple lenses, each with different refractory characteristics, in tandem so that each compensates for some imperfection in another. The need for aberration correction is especially severe when an optical element is called upon to image a large object field over a wide viewing angle.

More recently, Fresnel zone plates have been employed for optical imaging by a diffraction phenomenon. A Fresnel zone plate is often preferred over a lens, since a desired focal length may be obtained easily and inexpensively. As is well known, one technique to construct a Fresnel zone plate is to interfere two coherent light beams at a finite angle therebetween in a manner determined by the desired focal length. This interference pattern is recorded on a detector which is generally photographic film but may also be photochromic glass, F-center crystals, or some other appropriate radiation detecting material. A zone plate may be so constructed to be free of spherical aberrations between certain focal planes, but the remaining four aberrations exist. One compensation approach is to place several zone plates in tandem for aberration correction, much like the lens technique.

Therefore, it is a primary object of this invention to simplify aberration correction in a Fresnel zone plate for improved imaging quality over a wide field of view.

It is another object of this invention to provide a simplified technique for improving image quality of large fields of view.

SUMMARY OF THE INVENTION

These and additional objects are accomplished by the method of constructing several zone plates in a single three-dimensional detector media in a manner that each zone plate images only a small distinct part of the object field that is within its aberration-free range. A partitioned field zone plate holographic lens so constructed is then used as an optical element to form a composite aberration-free image of the entire object field by joining together the images of each individual zone plate. A partitioned field zone plate is formed by multiple exposure to off-axis coherent radiation beams.

The subject matter regarded as this invention is described in the appended claims, but the invention may be best understood by reference to the following description taken in connection with the accompanying drawings.

DESCRIPTION OF THE PREFERRED EMBODIMENTS

Figure 1:
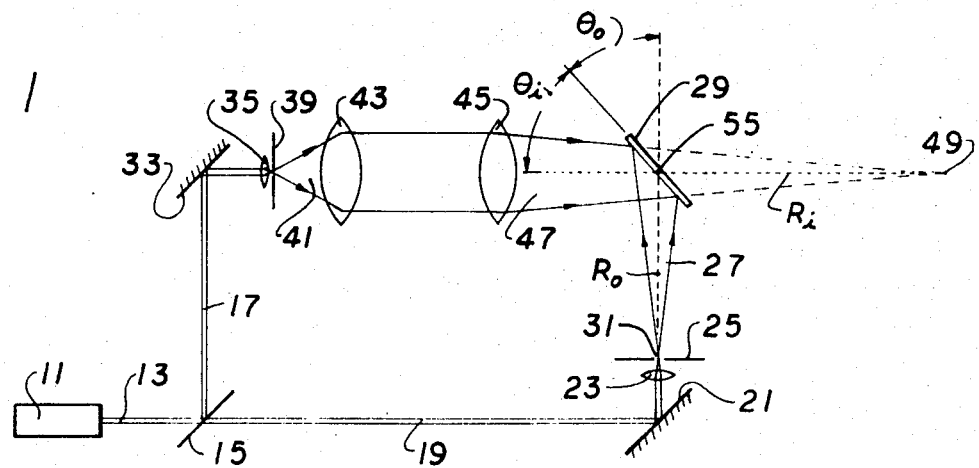
FIG. 1 illustrates one configuration for making a Fresnel zone plate by holographic techniques.

One method of making a Fresnel zone plate capable of imaging is shown in FIG. 1. A source of coherent radiation such as a laser light source 11 emits a narrow beam of light 13 which strikes a beam splitter 15, causing the intensity of the beam 13 to be approximately equally divided between a beam 17 and a beam 19. The light beam 19 is reflected from a mirror 21 into a lens 23. A pinhole filter 25 is placed at the focal point of the lens 23, assuming the beam 19 to be substantially collimated. A resulting clean diverging light beam 27 is then directed to a radiation detector 29 which is usually a photographic film. This configuration illuminates the detector 29 in a manner as if a point light source were placed at position 31 a distance $R_o$ from the center of the detector 29.

The light beam 17 is reflected from a mirror 33 into a lens 35. A pinhole filter 39 is placed at the focal plane of the lens 35 to present a clean diverging beam 41 to a collimating lens 43 and a beam converging lens 45. The converging light beam 47 then strikes the detector 29 in a manner to appear to originate from a virtual point source at point 49 at a distance $R_i$ from the center of the detector 29.

Figure 2:
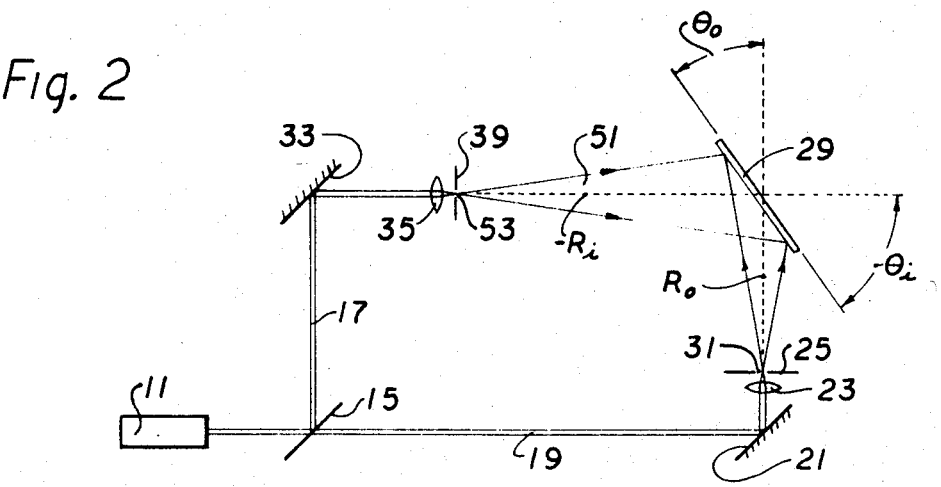
FIG. 2 illustrates a method for holographically constructing a Fresnel zone plate with characteristics different from the plate constructed according to FIG. 1.

In FIG. 2, a similar arrangement to that of FIG. 1 is shown, except that the converging beam 47 is replaced by a diverging beam 51 which appears to come from a point light source 53 a distance $-R_i$ from the center of the detector 29. This configuration is illustrated to show the flexibility available in constructing a Fresnel zone plate and the uses of these constructed plates will be discussed hereinafter.

As a background to aid in the explanation of the principles of the present invention, the use of a Fresnel zone plate as constructed by the configuration of FIG. 1 will be examined in some detail. If the detector 29 is a photographic film, this film is developed in a normal manner after exposure to the interference pattern of the diverging beam 27 and the converging beam 47 to result in a diffraction grating transparency which is the desired Fresnel zone plate 29' of FIG. 3. If illuminated point O is placed relative to zone plate 29' to be coincident with the apparent point light source 31 used in construction, the point O will be imaged by the zone plate to point i which is coincident with the apparent point virtual source 49 of the construction step of FIG. 1. The focal length of the zone plate 29 may be described by the fundamental lens formula, $$1/f = 1/R_o + 1/R_i \quad (1)$$

which may be expressed as, $$f = (R_o R_i)/(R_o + R_i) \quad (2)$$

If a second point O' is located a distance $R_o'$ from the zone plate along a radial line angularly displaced $\theta_o$ from the radial line $R_o$ to point O, an image $i'$ of this point a distance $R_i'$ will result which is rotated through an angle $\Phi_i$ from the radial distance $R_i$. The location of $i'$ may be determined as follows, since the focal length of the zone plate 29' has been calculated according to equation (2):

$$1/f = 1/R_o' + 1/R_i' \quad (3)$$

$$R_i' = f R_o'/R_o' - f \quad (4)$$

Furthermore, $\theta_o$ is approximately equal to $\theta_i$. It can be seen then that a Fresnel zone plate may be utilized as an ordinary lens and the basic laws of optics apply.

It should be noted that in construction of the Fresnel zone plate 29' according to the configuration of FIG. 1, the distance $R_o$ is the radius of curvature of the light wave front which apparently emanates from a point source 31. Since the radius of curvature of this wave front will not be constant along the detector 29, a point 55 approximately in the center of the detector 29 is chosen for convenience to measure the light beam curvature. Similarly, the radius of curvature of the wave front apparently emanating from the virtual point source 49 is also measured at this approximate center point for convenience throughout this analysis.

Figure 3:
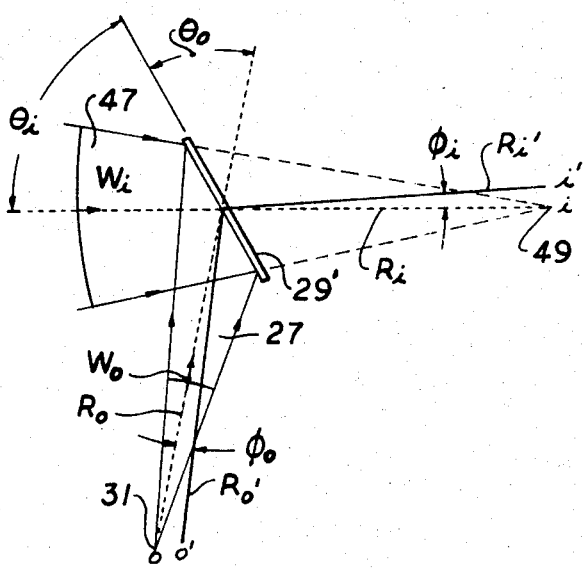
FIG. 3 illustrates the imaging properties of a Fresnel zone plate constructed according to the configuration of FIG. 1.
Figure 4:
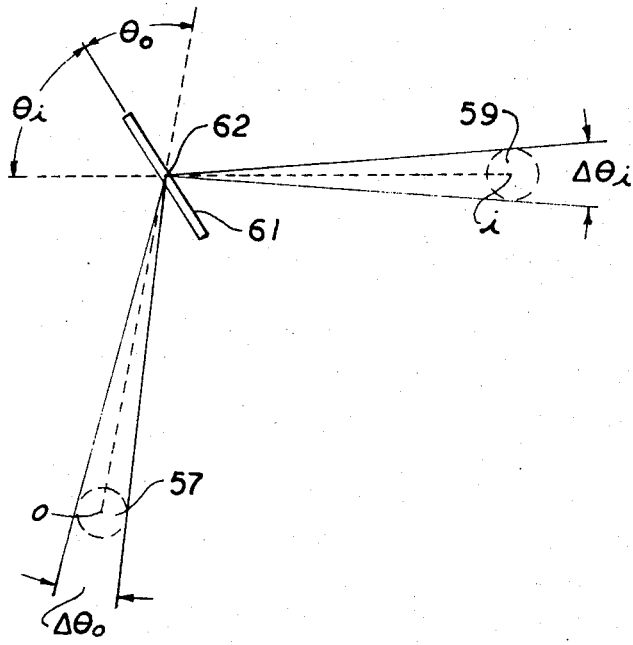
FIG. 4 illustrates the imaging characteristics of a Fresnel zone plate which has been holographically constructed in a three-dimensional detector media.

As the object point O' of FIG. 3 moves further away from point O, the lens formula (4) will not hold exactly because of the aforementioned aberrations of the Fresnel zone plate 29'. However, within a certain limited range these aberrations are not noticeable. Therefore, if a limited object area 57 around point O in FIG. 4 is to be imaged onto area 59 around point $i$, the image will be substantially unaberrated throughout all points of the area imaged. The field of view may be limited to this unaberrated region by constructing the Fresnel zone plate 61 from a three-dimensional detector media. An example of such a media is a photographic film with a thick emulsion. When such a film is exposed according to the configuration of FIG. 1, the zone plate 61 will have angular sensitivity and will image light rays striking it only within a certain range of angles $\theta_o$.

The use of a three-dimensional detector in the construction of a Fresnel zone plate causes the zone plate to produce an angular discrimination in the intensity of the image produced. That is, light rays whose incident angle differs from the incident angle $\theta_o$ used in the construction of the zone plate will have an intensity significantly reduced from those rays whose angle is $\theta_o$. This angular deviation, $\Delta\theta_o$, is measured in the plane formed by the points O, $i$, and the center 62 of the zone plate 61, i.e. the plane of the paper in FIG. 4. The image intensity of object points near the object point O, but not in the plane of the paper, will have a somewhat reduced intensity but the intensity discrimination will in general not be as sharp as for rotations in the plane of the paper.

Figure 5:
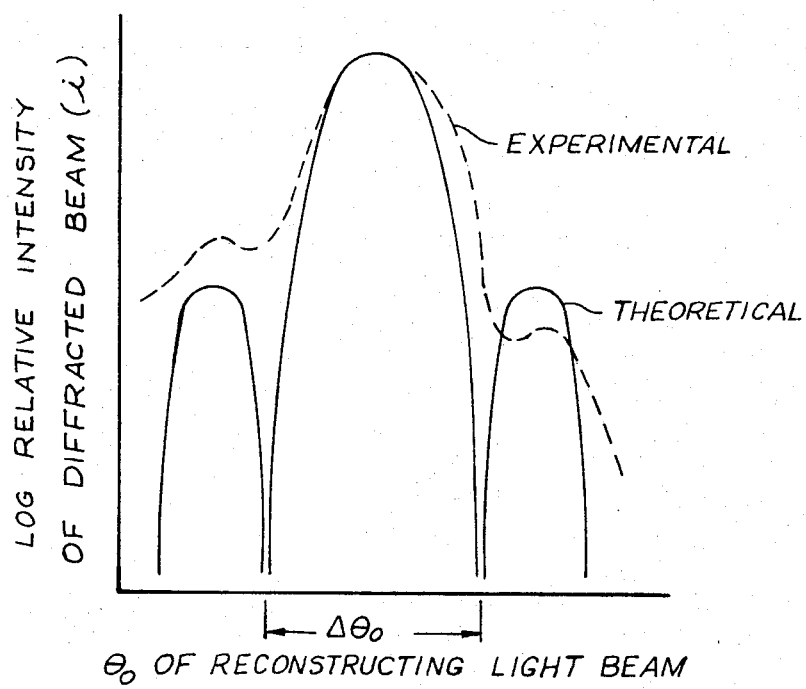
FIG. 5 illustrates the light intensity diffraction efficiency of a typical three-dimensional Fresnel zone plate.

The variation of intensity with angle can be more clearly understood with reference to FIG. 5. The intensity of the diffracted wave $i$ is shown as a function of the angle $\theta_o$ which is the angle that a reconstructing light beam coming from an object or light source will make with the zone plate 61. It is seen that there is not a sharp dropoff of light intensity with angular change and $\Delta\theta_o$ has been indicated rather arbitrarily between points where the intensity of the diffracted wave has substantially dropped off. This characteristic curve will change if any of the following variables change: $\theta_o$, in FIG. 1, the angle that a zone plate constructing beam strikes photographic film; the angle $\theta_o + \theta_i$ in the construction configuration of FIG. 1, which is the angle between the two interfering beams used to expose the photographic film to make the zone plate; thirdly, the thickness of the photographic film emulsion. For more complete information as to this particular characteristic of thick emulsion photographic film, reference may be had to an article "Holographic Data Storage in Three-Dimensional Media," by E. N. Leith et al., appearing in Applied Optics, Vol. 5, No. 8, (Aug. 1966) page 1303.

Figure 6:
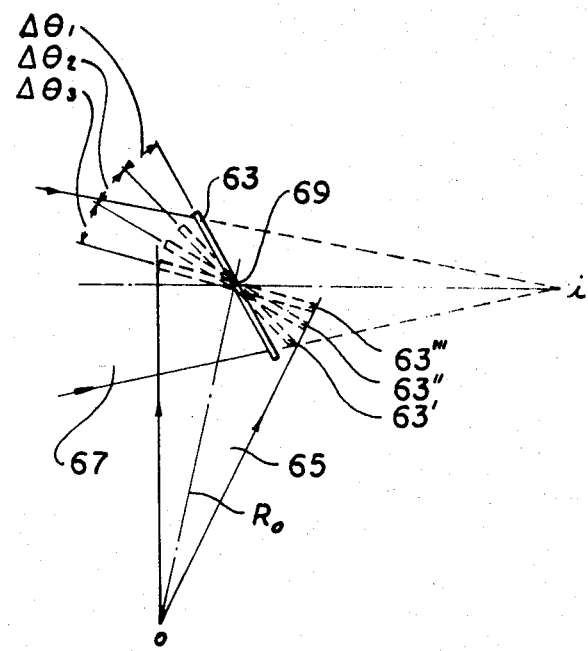
FIG. 6 illustrates one technique for constructing a partitioned field zone plate according to this invention.

In order to construct a zone plate which will provide unaberrated imaging over a larger object volume than that represented by the area 57 of FIG. 4, several zone plates may be constructed on a single thick emulsion photographic film. Each individual zone plate will then be capable of imaging an incremental object volume. The photographic film may be exposed in a manner so that during its use the images of the individual object volumes are fused together to result in a composite image which is the sum of the images from each of the individual zone plates. In FIG. 6, a technique for constructing such a multiple zone plate is illustrated. A thick emulsion photographic film 63 is exposed to a light wave 65 which appears to come from a point source O a distance $R_o$ from the film center. The film 63 is also exposed to a light wave 67 which appears to come from the virtual point source $i$ a distance $R_i$ from the film center. The two wave fronts 65 and 67 then interfere and this interference pattern is recorded on the photographic film 63.

This exposure will create a zone plate with a limited field of view $\Delta\theta_o$ according to the principles described with reference to FIG. 5. The film 63 is rotated into position 63' through an angle $\Delta\theta_1$ which is related to this angular field of view and another exposure is made to the interfering wave fronts 65 and 67. A third exposure may be made if film 63' is rotated an additional amount to a position 63'', and similarly a fourth exposure can be made when rotated to position 63'''. It should be noted that the angles $\Delta\theta_1$, $\Delta\theta_2$, and $\Delta\theta_3$ need not be equal. The resulting partition field zone plate 63 will then be capable of imaging a spherical surface of radius $R_o$ with a center of curvature at the center point 69 of the zone plate 63 onto another spherical surface of radius $R_i$ with a center of curvature at the same point 69. If the object which is desired to be imaged without aberrations is not a spherical surface, the distances $R_o$ and $R_i$ may be altered between exposures during construction to conform to the surface to be imaged.

Figure 7:
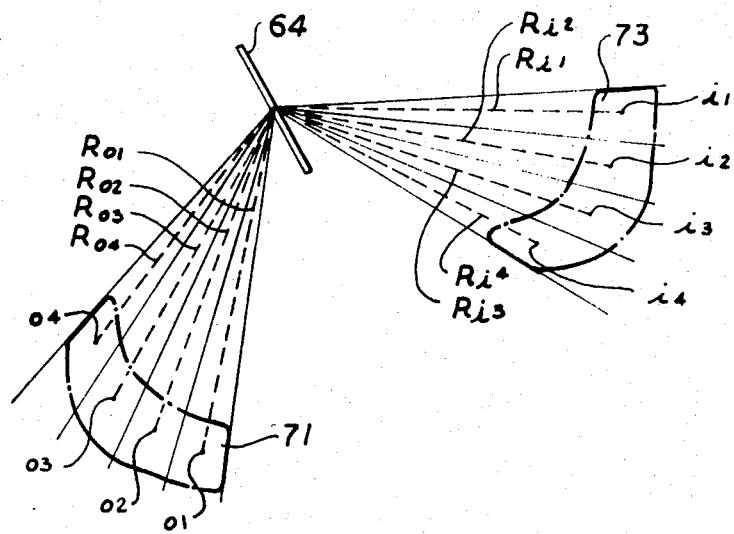
FIG. 7 illustrates the use of a partitioned field zone plate constructed according to the configuration of FIG. 6.

In FIG. 7, the imaging of such an object field 71 into an image field 73 is illustrated. The points O1, O2, O3, and O4, as well as $i1$, $i2$, $i3$, and $i4$, all illustrate positions of the two apparent point sources of coherent light which are used to construct the partition field zone plate 64 by four exposures. This FIG. clearly illustrates how an object field 71 may be partitioned into four zones and each imaged independently to form a composite image 73 of these four zones.

Figure 8:
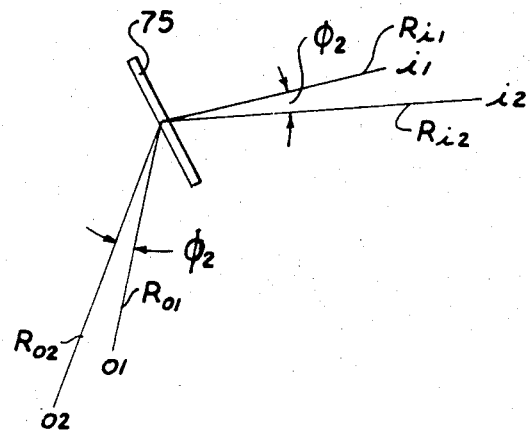
FIG. 8 illustrates a technique for constructing a more general partitioned field zone plate according to this invention.

A more general method of constructing a partition field zone plate is described with reference to FIG. 8. A detector 75 is first illuminated by point source O1 a distance $R_{O1}$ from an approximate center of the detector 75 and corresponding to a point of an object field which is desired to be imaged. A virtual point source is located at a position $i1$ a distance $R_{i1}$ from an approximate center of the hologram 75 and located where an image surrounding the point O1 will be desired to be produced by the finished lens. Once these two points are fixed, the focal length of the lens may be calculated according to equation (2).

In making a second exposure, the point light source is moved to a position O2 a distance $R_{O2}$ from the hologram 75 and rotated an angle $\theta_2$ with respect to the hologram from the first exposure. The virtual light source must be placed along a line shown to have been rotated $\theta_2$ from the $R_{i1}$ line of the first exposure and at a point $i2$ a distance $R_{i2}$ which is calculated according to equation (4), where $f$ is the focal length as determined by the first exposure. Similarly, a third or any number of subsequent points may be used to make additional zone plates which correspond to the various volumes of an object field of some irregular shape which is to be imaged.

Figure 9:
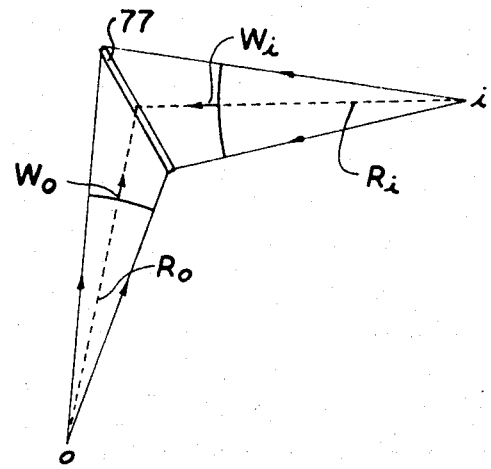
FIG. 9 illustrates a technique for making a partitioned field zone plate according to this invention by the techniques employed to construct a back beam hologram.

The invention has so far been described wherein the two interfering light beams strike the holographic detector at one side. However, it may be an advantage in certain circumstances where the detector is photographic film to illuminate the emulsion from opposite sides as is shown in FIG. 9, a known technique for constructing back beam holograms. A real point source O and a real point source $i$ illuminate the photographic film 77 from opposite sides thereof. The advantage to this configuration over that of the light striking the film from the same side is that the diffraction efficiency characteristics of the resulting film will be different, generally having sharper cutoffs, and may be an advantage for certain applications.

It should also be noted that the above techniques could be modified for constructing a lens capable of imaging an object illuminated with more than one wavelength, and thus be useful in color imaging. To construct such a zone plate, it will be necessary to illuminate the detector with a plurality of wavelengths for each exposure hereinabove described. The multiple wavelengths used to construct the hologram may be applied simultaneously or one at a time, according to techniques of color holography.

Figure 10:
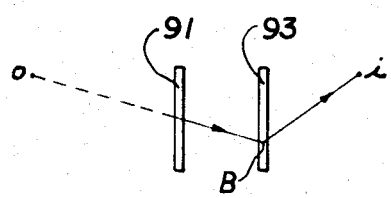
FIG. 10 shows a use of tandem partitioned field zone plates.

The techniques of this invention may also be used for a variety of desired results by placing in tandem several distinct partition field zone plates for various effects. For example, as already mentioned in connection with FIG. 4, the angular discrimination of the image intensity is sharp for rotations in the plane of the paper, but not for other rotations, say into the plane of the paper. Sharp angular discrimination in this plane can also be obtained by use of another partitioned zone plate placed in tandem with the first plate. As shown in FIG. 10, the light emerging from a first zone plate 91 serves as the incident light for a second zone plate 93. Sharp angular discrimination can be achieved in the plane formed by points $OB_i$ and the plane can be oriented at some angle different from the corresponding plane of diffraction for the first zone plate 91.

Other uses of tandem holographic lenses include (1) using multiple plates to simulate a thicker element than can be achieved with a single plate, (2) orienting the sound plate so that the final light beam emerging from the pair will be in the same direction as the incident beam, and (3) use of a second plate to compensate for the chromatic dispersion that would be present from the use of a single element.

It shall be understood that the invention is not limited to the specific arrangements shown, and that changes and modifications may be made within the scope of the appended claims.

What I claim is:

1. A method of imaging an object field, comprising the steps of:

constructing a plurality of Fresnel zone plates, each of said zone plates being capable of imaging with substantial exclusivity a single incremental volume of said object field different from the incremental volumes imaged by any others of the plurality of zone plates, the total of said incremental object field volumes being that portion of the object field to be imaged, whereby each of said volumes may be made small enough to be imaged by its associated Fresnel zone plate without significant aberration, illuminating said object field with electromagnetic radiation, and positioning said plurality of Fresnel zone plates relative to the object field to image their associated object field incremental volumes in a manner to form a composite image of the object field.

2. A method of constructing a holographic lens capable of imaging a wide object field with a low level of aberration, comprising the steps of:

exposing a three-dimensional photosensitive media simultaneously to a first wave front of coherent light having a first center of curvature located relative to said photosensitive media and a second wave front of coherent light having a second center of curvature located relative to said photosensitive media, said first and second wave fronts being mutually coherent, thereby forming a first zone plate, and making at least a second exposure of said photosensitive media simultaneously to mutually coherent third and fourth wave fronts of light having third and fourth centers of curvature located relative to said photosensitive media, respectively, thereby forming a second zone plate superimposed over the first zone plate, the positions of said first and third centers of curvature being spaced a sufficient distance from each other so that a point of said object field coincident with said first center of curvature is imaged only by the first zone plate and a point of said object field coincident with said third center of curvature is imaged only by the second zone plate.

3. A method of constructing a holographic lens according to claim 2 wherein a mathematical product of the distances from the photosensitive media to said first and second centers of curvature divided by a sum of these distances is equal to the same quantity as a product of the distances from the photosensitive media to said third and fourth centers of curvature divided by a sum of these distances, said quantity being the focal length of said holographic lens.

4. A method of imaging a wide object field with a low aberration level by using a holographic lens constructed according to the method of claim 4 and further including the step of placing the lens relative to the illuminated object field to produce an image thereof.

5. A method of imaging a wide object field with a low aberration level by using a holographic lens constructed according to the method of claim 2 and further including the step of placing the lens with said first and third centers of curvature located within said object field, thereby forming images at said second and fourth centers of curvature of those portions of said object field coincident with the holographic lens' first and third centers of curvature, respectively.

6. A method of imaging a wide object field with a low aberration level by using a holographic lens, comprising the steps of:

intersecting two beams of mutually coherent electromagnetic radiation without pictorial information at a predetermined finite angle therebetween, placing a three-dimensional detector media in said beams, changing the relative rotational positions between said detector and said beams an incremental amount between said detector and said beams an incremental amount between successive exposures to said radiation, thereby to record on said detector a plurality of interference patterns between said beams in the form of a holographic lens, and placing the lens relative to the object field to produce an image thereof.

7. A method of imaging an object field, comprising the steps of:

constructing a plurality of Fresnel zone plates on a common area of a thick photosensitive system by sequentially exposing said system to the intersection of a pair of mutually coherent electromagnetic radiation beams having particular angles with respect to said system and particular wave front curvatures of said beams for each exposure, thereby to construct an individual zone plate as a result of each exposure, said angles of intersection and said wave front curvatures being related between exposures for a given thickness of said photosensitive system so that each of said zone plates is capable of imaging with substantial exclusivity a single incremental volume of said object field different from the incremental volumes imaged by any others of the plurality of zone plates, whereby each of said volumes may be made small enough to be imaged by its associated zone plate without significant aberration, illuminating said object field with electromagnetic radiation, and positioning said photosensitive system relative to the object field so that each zone plate constructed on said system images its associated incremental volume of the object field to form a composite image of the object.

8. A method of constructing a holographic lens according to claim 2 wherein said first and second wave fronts are of the same radiation wavelength as said third and fourth wave fronts.

PO-1050
(5/69)

UNITED STATES PATENT OFFICE
CERTIFICATE OF CORRECTION

Patent No. 3,586,412          Dated  June 22, 1971

Inventor(s)  Emmett N. Leith

It is certified that error appears in the above-identified patent and that said Letters Patent are hereby corrected as shown below:

Page 1, column 2, the firm name should be changed from Woodcock, Kurtz & Machiewicz to --Woodcock, Washburn, Kurtz and Mackiewicz--.

Column 2, line 53, correct 29 to --29'--.

line 54, change the equation "$1/f = 1/R_o 12/3 R_i$" to --$1/f = 1/R_o + 1/R_i$--.

line 56, change the equation "$f = (R_o R_i)/(R_o + R)$" to --$f = R_o R_i / R_o + R_i$--.

line 67, at the end of the equation after the hyphen the letter --f-- should be inserted.

Column 5, line 13, change the word "sound" to --second--.

Claim 4, line 8, change the number "4" to --2--.

Signed and sealed this 21st day of December 1971.

(SEAL)
Attest:

EDWARD M. FLETCHER, JR.          ROBERT GOTTSCHALK
Attesting Officer                Acting Commissioner of Patents